(12) United States Patent
Zou et al.

(10) Patent No.: US 7,724,040 B2
(45) Date of Patent: May 25, 2010

(54) NETWORK OVERCLOCK CONTROL CIRCUIT

(75) Inventors: Hua Zou, Shenzhen (CN); Feng-Long He, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 133 days.

(21) Appl. No.: 12/023,010

(22) Filed: Jan. 30, 2008

(65) Prior Publication Data

US 2009/0164828 A1    Jun. 25, 2009

(30) Foreign Application Priority Data

Dec. 21, 2007    (CN) .......................... 2007 1 0203315

(51) Int. Cl.
    H03K 5/153    (2006.01)
(52) U.S. Cl. ....................................................... 327/74
(58) Field of Classification Search .............. 327/74–76
    See application file for complete search history.

(56) References Cited

U.S. PATENT DOCUMENTS 6,552,578 B1 *    4/2003    Cheung et al. ................ 327/26
2006/0139063 A1 *    6/2006    Yano et al. .................... 327/74

* cited by examiner

*Primary Examiner*—Quan Tra
(74) *Attorney, Agent, or Firm*—Frank R. Niranjan

(57) ABSTRACT

A network overclock control circuit for a computer includes an RC circuit, first and second comparator circuits, and first and second switch circuits. A signal pin of a network indicating lamp is connected to input terminals of the first and second comparator circuits via the RC circuit. Output terminals of the first and second comparator circuits are respectively connected to first and second clock pins of a clock chip via the first and second switch circuits. When network has little traffic, the first and second comparator circuits control the first and second switch circuits to output low level signals. When network has medium to high traffic, the first and second comparator circuits control the first and second switch circuits to output high and low level signals. When network is overloaded, the first and second comparator circuits control the first and second switch circuits to output high level signals.

17 Claims, 1 Drawing Sheet

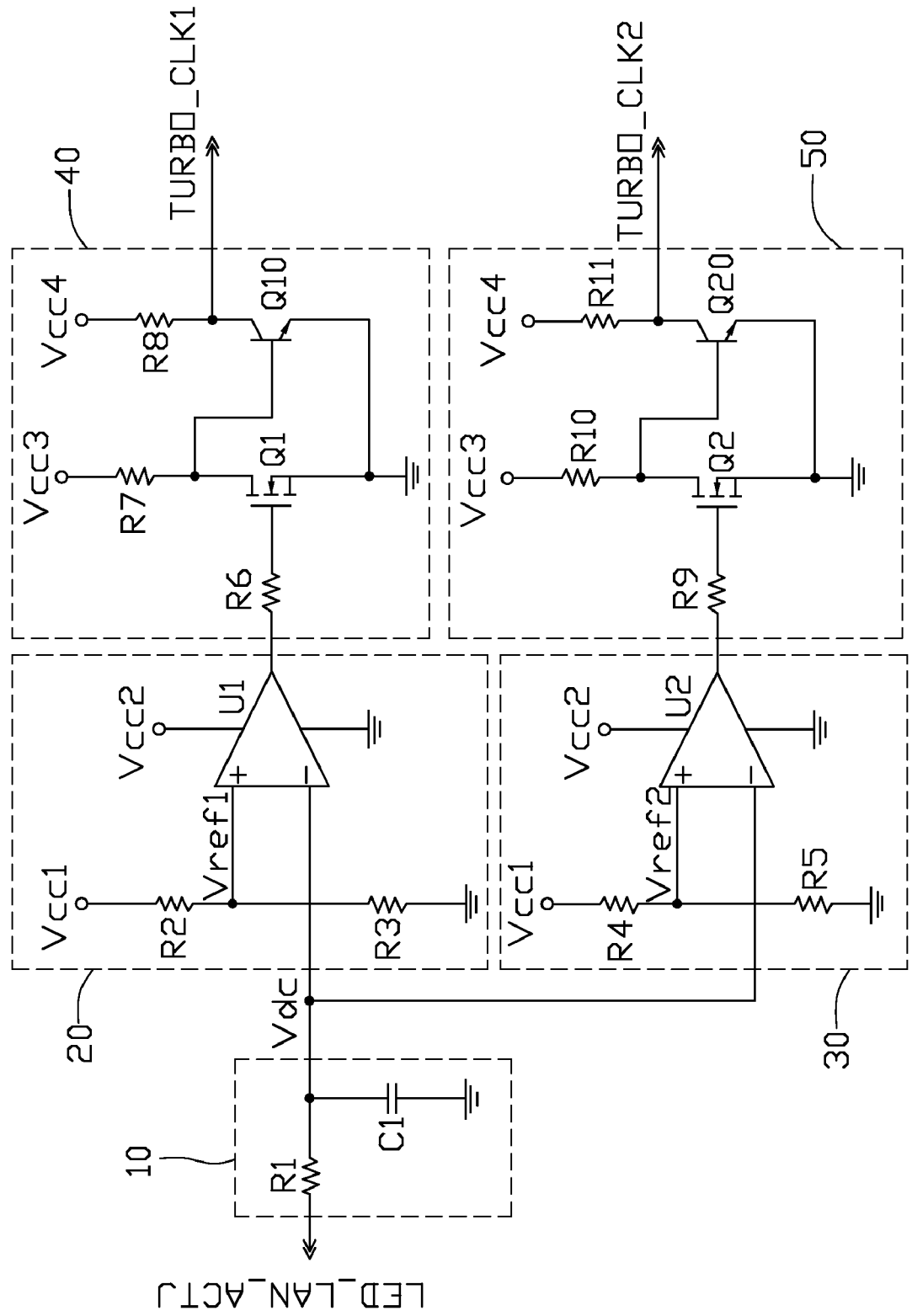

NETWORK OVERCLOCK CONTROL CIRCUIT

BACKGROUND

1. Field of the Invention

The present invention relates to an overclock control circuit.

2. Description of Related Art

The technique of overclocking is to make a central processing unit (CPU) run at a higher speed by adjusting the working frequency to be above the normal frequency. For example, the working frequency of Pentium IV 2.4 can be adjusted to 2800 MHz, thus improving the speed of the CPU.

Conventionally overclocking of the CPU is achieved manually by a user, however the steps involved are complicated and if not done right can lead to problems and instability with the device using the CPU.

What is desired, therefore, is to provide an overclock control circuit for automatically adjusting CPU frequency of a computer according to a status of a network.

SUMMARY

An exemplary network overclock control circuit for a computer includes a resistor/capacitor (RC) circuit, first and second comparator circuits, and first and second switch circuits. An input terminal of the RC circuit is connected to a signal pin of a network indicating lamp to receive a pulse signal. The RC circuit converting the pulse signal to a direct current (DC) voltage. An input terminal of the first comparator circuit is connected to the DC voltage. An input terminal of the second comparator circuit is connected to the DC voltage. An output terminal of the first comparator circuit is connected to an input terminal of the first switch circuit. An output terminal of the second comparator circuit is connected to an input terminal of the second switch circuit. An output terminal of the first switch circuit is connected to a first clock pin of a clock chip. An output terminal of the second switch circuit is connected to a second clock pin of the clock chip. When the network has little traffic, the first and second comparator circuits output control signals to control the first and second switch circuits to output low level signals. When the network has medium to high traffic, the first and second comparator circuits output control signals to control the first and second switch circuits to output a high level signal and a low level signal respectively. When the network is overloaded, the first and second comparator circuits output control signals to control the first and second switch circuits to output high level signals. The clock chip controls overclocking of the CPU according to signal levels of the first and second clock pins.

Other advantages and novel features of the present invention will become more apparent from the following detailed description of preferred embodiment when taken in conjunction with the accompanying drawing, in which:

BRIEF DESCRIPTION OF THE DRAWINGS

The drawing is a circuit diagram of an overclock control circuit in accordance with an exemplary embodiment of the present invention.

DETAILED DESCRIPTION

Referring to the drawing, an overclock control circuit for a central processing unit (CPU) in accordance with an exemplary embodiment of the present invention includes an RC circuit 10, two comparator circuits 20 and 30, and two switch circuits 40 and 50.

The RC circuit 10 includes a resistor R1 and a capacitor C1. A signal pin LED_LAN_ACTJ of a network indicating lamp of a computer is grounded via the resistor R1 and the capacitor C1 in series. The RC circuit converts a pulse signal from signal pin LED_LAN_ACTJ of a network indicating lamp to a direct current (DC) voltage Vdc. The DC voltage Vdc is connected to a node between the resistor R1 and the capacitor C1.

The comparator circuit 20 includes a comparator U1. Resistors R2 and R3 connected in series between a power source Vcc1 and ground, form a voltage divider. The inverting input terminal of the comparator U1 is connected to the DC voltage Vdc. The non-inverting input terminal (reference terminal) of the comparator U1 is connected to a node between the resistor R2 and the resistor R3 to receive a reference voltage Vref1. The power terminal of the comparator U1 is connected to a power source Vcc2.

The comparator circuit 30 includes a comparator U2. Resistors R4 and R5 connected in series between the power source Vcc1 and ground, form a voltage divider. The inverting input terminal of the comparator U2 is connected to the DC voltage Vdc. The non-inverting input terminal (reference terminal) of the comparator U2 is connected to a node between the resistor R4 and the resistor R5 to receive a reference voltage Vref2. The power terminal of the comparator U2 is connected to the power source Vcc2.

The reference voltage Vref1 can be selected according to the values chosen for the resistances of the resistors R2 and R3. The reference voltage Vref2 can be selected according to the values chosen for the resistances of the resistors R4 and R5. The reference voltage Vref1 is set to be greater than the reference voltage Vref2.

The switch circuit 40 includes two transistors Q1 and Q10. The gate of the transistor Q1 is connected to the output terminal of the comparator U1 via a resistor R6. The drain of the transistor Q1 is connected to a power source Vcc3 via a resistor R7, and connected to the base of the transistor Q10. The source of the transistor Q1 is connected to the emitter of the transistor Q10, and ground. The collector of the transistor Q10 is connected to a power source Vcc4 via a resistor R8, and connected to a clock pin TURBO_CLK1 of a clock chip (not shown).

The switch circuit 50 includes two transistors Q2 and Q20. The gate of the transistor Q2 is connected to the output terminal of the comparator U2 via a resistor R9. The drain of the transistor Q2 is connected to the power source Vcc3 via a resistor R10, and connected to the base of the transistor Q20. The source of the transistor Q2 is connected to the emitter of the transistor Q20, and ground. The collector of the transistor Q20 is connected to the power source Vcc4 via a resistor R11, and connected to a clock pin TURBO_CLK2 of the clock chip. The clock chip provides control signals from the clock pins TURBO_CLK1 and TURBO_CLK2 to control frequency of the CPU.

In this embodiment, the transistors Q1 and Q2 are N-channel field effect transistors (FETs), and the transistors Q10 and Q20 are NPN bipolar junction transistors (BJTs).

When the network has little traffic, the signal pin LED_LAN_ACTJ of the network indicating lamp outputs a high level signal. The DC voltage Vdc received by the inverting input terminal of the comparator U1 is greater than the reference voltage Vref1 of the non-inverting input terminal of the comparator U1. The comparator U1 outputs a low level signal. The FET Q1 is turned off. The transistor Q10 is turned on.

The collector of the transistor Q10 outputs a low level signal to the clock pin TURBO_CLK1 of the clock chip. The DC voltage Vdc received by the inverting input terminal of the comparator U2 is greater than the reference voltage Vref2 of the non-inverting input terminal of the comparator U2. The comparator U2 outputs a low level signal. The FET Q2 is turned off. The transistor Q20 is turned on. The collector of the transistor Q20 outputs a low level signal to the clock pin TURBO_CLK2 of the clock chip. The CPU is not overclocked.

When the network has medium to high traffic, the signal pin LED_LAN_ACTJ of the network indicating lamp outputs a pulse signal with a low frequency (making the blink frequency low). The voltage Vdc is reduced to be less than the reference voltage Vref1 of the non-inverting input terminal of the comparator U1 but greater than the reference voltage Vref2 of the non-inverting input terminal of the comparator U2. The comparator U1 outputs a high level signal. The FET Q1 is turned on. The transistor Q10 is turned off, the clock pin TURBO_CLK1 of the clock chip receives a high level signal. The comparator U2 outputs a low level signal. The FET Q2 is turned off. The transistor Q20 is turned on, the collector of the transistor Q20 outputs a low level signal to the clock pin TURBO_CLK2 of the clock chip. The CPU is automatically overclocked by a predetermined intermediate amount.

When the network is overloaded, the signal pin LED_LAN_ACTJ of the network indicating lamp outputs a pulse signal with a high frequency (making the blink frequency high). The voltage Vdc is reduced to be less than the reference voltage Vref1 of the non-inverting input terminal of the comparator U1, and reduced to be less than the reference voltage Vref2 of the non-inverting input terminal of the comparator U2. The comparator U1 outputs a high level signal. The FET Q1 is turned on. The transistor Q10 is turned off. The clock pin TURBO_CLK1 of the clock chip receives a high level signal. The comparator U2 outputs a high level signal. The FET Q2 is turned on. The transistor Q20 is turned off. The clock pin TURBO_CLK2 of the clock chip receives a high level signal. The CPU is automatically overclocked by large predetermined amount.

The user may activate or deactivate the network overclock control circuit in the BIOS (base input/output system) of the computer. When the network overclock control circuit is opened, the CPU of the computer can automatically adjust frequency according to a status of the network loading. The network overclock control circuit is simple, and low-cost.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An overclock control circuit for a central processing unit (CPU) comprising:
   an RC circuit, an input terminal of the RC circuit connected to a signal pin of a network indicating lamp to receive a pulse signal, the RC circuit converting the pulse signal to a direct current (DC) voltage;
   a first comparator circuit, an input terminal of the first comparator circuit connected to an output terminal of the RC circuit to receive the DC voltage;
   a second comparator circuit, an input terminal of the second comparator circuit connected to the output terminal of the RC circuit to receive the DC voltage;
   a first switch circuit, an output terminal of the first comparator circuit connected to an input terminal of the first switch circuit, an output terminal of the first switch circuit connected to a first clock pin of a clock chip; and
   a second switch circuit, an output terminal of the second comparator circuit connected to an input terminal of the second switch circuit, an output terminal of the second switch circuit connected to a second clock pin of the clock chip;
   wherein when a network has little traffic, the signal pin of the network indicating lamp outputs a high level signal, the first and second comparator circuits output control signals to control the first and second switch circuits to output low level signals to the first and second clock pins of the clock chip, to prevent the CPU from overclocking;
   when the network has medium to high traffic, the signal pin of the network indicating lamp outputs a pulse signal with a low frequency, the first and second comparator circuits output control signals to control the first and second switch circuits to output a high level signal and a low level signal respectively to the first and second clock pins of the clock chip, to control the CPU to automatically overclock by a predetermined intermediate amount; and
   when the network is overloaded, the signal pin of the network indicating lamp outputs a pulse signal with a high frequency, the first and second comparator circuits output control signals to control the first and second switch circuits to output high level signals to the first and second clock pins of the clock chip, to control the CPU to automatically overclock by large predetermined amount.

2. The overclock control circuit as claimed in claim 1, wherein the RC circuit comprises a resistor and a capacitor, the signal pin of the network indicating lamp is grounded via the resistor and the capacitor in series, a node between the resistor and the capacitor outputs the DC voltage.

3. The overciock control circuit as claimed in claim 1, wherein the first comparator circuit comprises a first comparator, a power source is grounded via two resistors in series, the non-inverting input terminal of the first comparator is connected to a node between the two resistors, the inverting input terminal of the comparator receives the DC voltage.

4. The overclock control circuit as claimed in claim 3, wherein the first switch circuit comprises first and second transistors, the gate of the first transistor is connected to the output terminal of the first comparator, the drain of the first transistor is connected to a power source and the base of the second transistor, the source of the first transistor is connected to the emitter of the second transistor and grounded, the collector of the second transistor is connected to a power source and the first clock pin of the clock chip.

5. The overclock control circuit as claimed in claim 4, wherein the first transistor of the first switch circuit is an N-channel field effect transistor, and the second transistor of the first switch circuit is an NPN bipolar junction transistor.

6. The overclock control circuit as claimed in claim 1, wherein the second comparator circuit comprises a second comparator, a power source is grounded via two resistors in series, the non-inverting input terminal of the second comparator is connected to a node between the two resistors, the inverting input terminal of the second comparator receives the DC voltage.

7. The overclock control circuit as claimed in claim 6, wherein the second switch circuit comprises first and second transistors, the gate of the first transistor is connected to the output terminal of the second comparator, the drain of the first transistor is connected to a power source and the base of the second transistor, the source of the first transistor is connected to the emitter of the second transistor and grounded, the collector of the second transistor is connected to a power source and the second clock pin of the clock chip.

8. The overclock control circuit as claimed in claim 7, wherein the first transistor of the second switch circuit is an N-channel field effect transistor, and the second transistor of the second switch circuit is an NPN bipolar junction transistor.

9. An overclock control circuit comprising:
an RC circuit, an input terminal of the RC circuit connected to a signal pin of a network status indicating lamp to receive a pulse signal which indicates a network status, the RC circuit converting the pulse signal to a direct current (DC) voltage;
a first comparator circuit comprising an input terminal receiving the DC voltage, a reference terminal receiving a first reference voltage, and an output terminal outputting a first control signal;
a second comparator circuit comprising an input terminal receiving the DC voltage, a reference terminal receiving a second reference voltage, and an output terminal outputting a second control signal, wherein the second reference voltage is greater than the first reference voltage;
a first switch circuit receiving the first control signal and outputting a first output voltage according to the first control signal; and
a second switch circuit receiving the second control signal and outputting a second output voltage according to the second control signal, wherein when a network has little traffic, the signal pin of the network indicating lamp outputs a high level signal, the first and second output voltages control the CPU to overclock; when the network has medium to high traffic, the signal pin of the network indicating lamp outputs a pulse signal with a low frequency, the first and second output voltages control the CPU to automatically overclock by a predetermined intermediate amount; when the network is overloaded, the signal pin of the network indicating lamp outputs a pulse signal with a high frequency, the first and second output voltages control the CPU to automatically overclock by large predetermined amount.

10. The overclock control circuit as claimed in claim 9, wherein the RC circuit comprises a resistor and a capacitor, the signal pin of the network indicating lamp is grounded via the resistor and the capacitor in series, a node between the resistor and the capacitor outputs the DC voltage.

11. The overclock control circuit as claimed in claim 9, wherein the first comparator circuit comprises a first comparator comprising an input terminal receiving the DC voltage, a reference terminal receiving the first reference voltage, and an output terminal outputting the first control signal, the second comparator circuit comprises a second comparator comprising an input terminal receiving the DC voltage, a reference terminal receiving the second reference voltage, and an output terminal outputting the second control signal.

12. The overclock control circuit as claimed in claim 11, wherein the first comparator circuit further comprises two resistors connected in series between a power source and ground, the reference terminal of the first comparator is connected to a node between the two resistors, the second comparator circuit further comprises two resistors connected in series between a power source and ground, the reference terminal of the second comparator is connected to a node between the two resistors.

13. The overclock control circuit as claimed in claim 11, wherein the first switch circuit comprises first and second transistors, the gate of the first transistor is connected to the output terminal of the first comparator, the drain of the first transistor is connected to a power source and the base of the second transistor, the source of the first transistor is connected to the emitter of the second transistor and grounded, the collector of the second transistor is connected to a power source and a first clock pin of a clock chip.

14. The overclock control circuit as claimed in claim 13, wherein the first transistor of the first switch circuit is an N-channel field effect transistor, and the second transistor of the first switch circuit is an NPN bipolar junction transistor.

15. The overclock control circuit as claimed in claim 13, wherein the clock chip provides control signals to control frequency of the CPU.

16. The overclock control circuit as claimed in claim 11, wherein the second switch circuit comprises first and second transistors, the gate of the first transistor is connected to the output terminal of the second comparator, the drain of the first transistor is connected to a power source and the base of the second transistor, the source of the first transistor is connected to the emitter of the second transistor and grounded, the collector of the second transistor is connected to a power source a second clock pin of the clock chip.

17. The overclock control circuit as claimed in claim 16, wherein the first transistor of the second switch circuit is an N-channel field effect transistor, and the second transistor of the second switch circuit is an NPN bipolar junction transistor.

* * * * *